(12) United States Patent
Sparr et al.

(10) Patent No.: US 8,249,042 B2
(45) Date of Patent: Aug. 21, 2012

(54) WIRELESS MESH NETWORK

(75) Inventors: Robert H. Sparr, Menlo Park, CA (US); William G. Olsen, Bozeman, MT (US); Thomas Hammel, San Francisco, CA (US); Kirk Alton Bradley, Menlo Park, CA (US); Mark J. Rich, Menlo Park, CA (US); Michael R. Franceschini, Centerport, NY (US); Joseph T. Merenda, Northport, NY (US)

(73) Assignee: Trilliant Networks, Inc., Redwood City, CA (US)

( * ) Notice: Subject to any disclaimer, the term of this patent is extended or adjusted under 35 U.S.C. 154(b) by 3499 days.

(21) Appl. No.: 10/122,762

(22) Filed: Apr. 15, 2002

(65) Prior Publication Data
US 2002/0181427 A1 Dec. 5, 2002

Related U.S. Application Data

(60) Provisional application No. 60/284,672, filed on Apr. 18, 2001.

(51) Int. Cl.
*H04J 1/00* (2006.01)
(52) U.S. Cl. .......... 370/343; 370/230; 370/433
(58) Field of Classification Search .......... 370/312, 370/315, 326, 328, 338, 408, 230, 343, 433; 455/3.04, 3.05, 7, 11.1, 25
See application file for complete search history.

(56) References Cited

U.S. PATENT DOCUMENTS

| | | | |
|---|---|---|---|
| 5,594,720 A | 1/1997 | Papadopoulos et al. | |
| 5,953,336 A | 9/1999 | Moore et al. | 370/395 |
| 6,049,593 A | 4/2000 | Acampora | |
| 6,611,519 B1* | 8/2003 | Howe | 370/386 |
| 6,654,616 B1* | 11/2003 | Pope et al. | 455/556.1 |
| 7,027,773 B1* | 4/2006 | McMillin | 455/41.2 |
| 2002/0027894 A1* | 3/2002 | Arrakoski et al. | 370/338 |
| 2002/0061009 A1* | 5/2002 | Sorensen | 370/351 |
| 2002/0072329 A1* | 6/2002 | Bandeira et al. | 455/7 |
| 2002/0089958 A1* | 7/2002 | Feder et al. | 370/338 |
| 2002/0159434 A1* | 10/2002 | Gosior et al. | 370/350 |
| 2003/0210698 A1* | 11/2003 | Rouleau | 370/397 |

FOREIGN PATENT DOCUMENTS

| | | |
|---|---|---|
| EP | 0 837 567 A2 | 4/1998 |
| EP | 0 837 567 A2 | 4/1999 |
| EP | 0 999 717 A2 | 5/2000 |
| EP | 1 098 455 A2 | 5/2001 |
| WO | WO 97/14056 | 4/1997 |
| WO | 98/39851 | 9/1998 |
| WO | 00/25483 | 5/2000 |

OTHER PUBLICATIONS

European Search Report dated Mar. 15, 2011 for EP Application No. 10180739.4-2412, 6 pages.

* cited by examiner

*Primary Examiner* — Jason Mattis
(74) *Attorney, Agent, or Firm* — Moser Taboada (57) ABSTRACT

Method and apparatus for providing a wireless mesh network and network node are described. More particularly, a network having network node neighborhoods is described. A node comprises a multi-sectored antenna and a transceiver controller. Nodes are configured for installation without antenna pointing and without pre-coordination with the network. Software architecture for the node is also described.

5 Claims, 10 Drawing Sheets

WIRELESS MESH NETWORK

RELATED APPLICATIONS

This application claims benefit of U.S. provisional patent application serial No. 60/284,672, filed Apr. 18, 2001, which is incorporated by reference.

This application is related to U.S. provisional patent application Ser. No. 60/284,678, filed 18 Apr. 2001 by Hammel et al, entitled "Network Channel Access Protocol" (hereinafter referred to as the Hammel application), which is incorporated by reference herein.

FIELD OF THE INVENTION

The invention relates generally to networks and network nodes, and more particularly to wireless mesh networks and network nodes.

BACKGROUND OF THE INVENTION

Consumer appetite for access to information continues to grow along with growth of the Internet. Corresponding to such growth, new information is added to the Internet constantly. With respect to multimedia content in particular, much of this information comes at a significant cost in bandwidth.

Telephone dial-up service is being replaced with broader bandwidth systems such as satellite, digital subscriber line (DSL), and cable modem. Unfortunately, these systems are not presently available to a significant portion of the population. Moreover, acquisition and installation costs associated with these systems make them less appealing.

Accordingly, wireless connectivity is on the rise. Wireless systems may be deployed more rapidly with less cost than their wired counterparts. Systems using cellular phone technologies are directed at providing mobile wireless Internet connectivity. Unfortunately, such systems are bandwidth limited.

Alternatives to cellular telephone technologies are cellular architectures providing high speed, data only services. An example is Multi-channel, Multi-point Distribution Service (MMDS) being provided by Sprint under the trade name Sprint Broadband Direct. Benefits of wireless systems for delivering high-speed services include rapid deployment without overhead associated with installation of local wired distribution networks. Unfortunately, MMDS relies upon long range transmissions and a sophisticated customer premise installation. Accordingly, Sprint has apparently determined that this approach is too expensive to be commercially viable.

What is needed is a fixed wireless solution with bandwidth comparable to DSL and cable modem technologies that is less complex to install and less costly. A mesh architecture and protocol serves these needs. In U.S. Pat. No. 5,682,382 to Shepard, a fixed wireless network is disclosed. In Shepard, the wireless network is based on a decentralized packet-radio concept using spread-spectrum technology for transmitting and receiving. However, Shepard is subject to limitations of spread spectrum technology.

Therefore, it would be desirable to provide a mesh network and node not dependent upon spread spectrum technology. More particularly, such a mesh system should be less difficult to install and deploy than MMDS system in order to be commercially viable.

SUMMARY OF THE INVENTION

An aspect of the present invention is network comprising network nodes. More particularly, the network nodes are arranged in network neighborhoods and configured for over-the-air with one another. Neighborhood access points coupled configured for over-the-air communication with the network nodes.

Another aspect of the present invention is a network infrastructure. More particularly a router is coupled to a point-of-presence (PoP). The PoP comprises a first segment switch, a first programmed computer configured as a first server and a first fiber interface. The PoP is coupled to the router via the segment switch. Metropolitan access point (MAP), comprising a second point-to-point radio, a second segment switch, a second programmed computer configured as a second server, a first network node, and a second fiber interface, is coupled to the PoP via the first fiber interface and the second fiber interface. A neighborhood access point (NAP), comprising a second point-to-point radio, a third segment switch, a third programmed computer configured as a third server and a second network node, is in communication with the MAP via the first point-to-point radio and the second point-to-point radio.

Another aspect of the present invention is a communications architecture. More particularly, a computer is configured with a transport protocol, a network protocol, a media access control protocol, and a first physical link layer. A network node is configured with the network protocol, the media access control and the first physical link layer, and configured with a channel access control protocol and a second physical link layer. The network node and the computer are in communication through the first physical link layer. At least one other network node is configured with the network protocol, the channel access control protocol and the second physical link layer. The at least one other network node and the network node in communication through the second physical link layer.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

System Architecture

Figure 1:
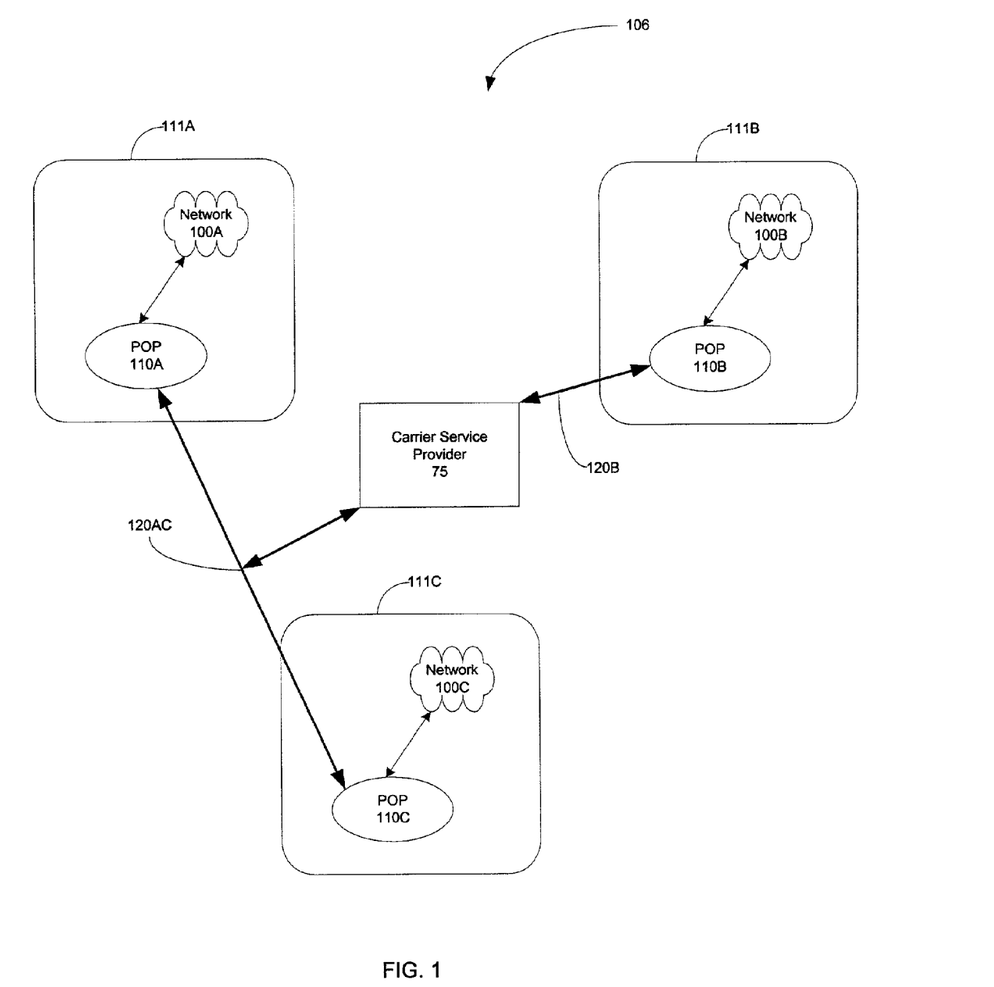
FIG. 1 is a network diagram depicting an exemplary portion of an embodiment of a network of interconnected metropolitan area networks (MANs) in accordance with an aspect of the present invention.

FIG. 1 is a network diagram depicting an exemplary portion of an embodiment of a network 106 of interconnected metropolitan area networks (MANs) 111 in accordance with an aspect of the present invention. MAN 111A comprises network 100A and point-of-presence (PoP) 110A. MAN 111B comprises network 100B and PoP 110B. MAN 111C comprises network 100C and PoP 110C. Each PoP 110 provides data transport services to and from carrier service provider network 75 via backbones, for example backbones 120AC and 120B. Moreover, PoPs 110 may be in direct communication with one another, for example PoPs 110A and 110C are depicted as being in direct communication with one another. Carrier service provider network 75 may be in communication with other carrier service providers via peering relationships. Thus, for example, PoP 110A may provide Internet Protocol (IP) data transport services to carrier service provider network 75 which may provide a Direct Internet Access (DIA) connection to another carrier service provider.

PoPs 110 may be carrier service provider network 75 PoPs. Such PoPs 110 may be co-located with a wireless Metropolitan Access Point (MAP) 103 (shown in FIG. 2).

Mesh Architecture

Figure 2:
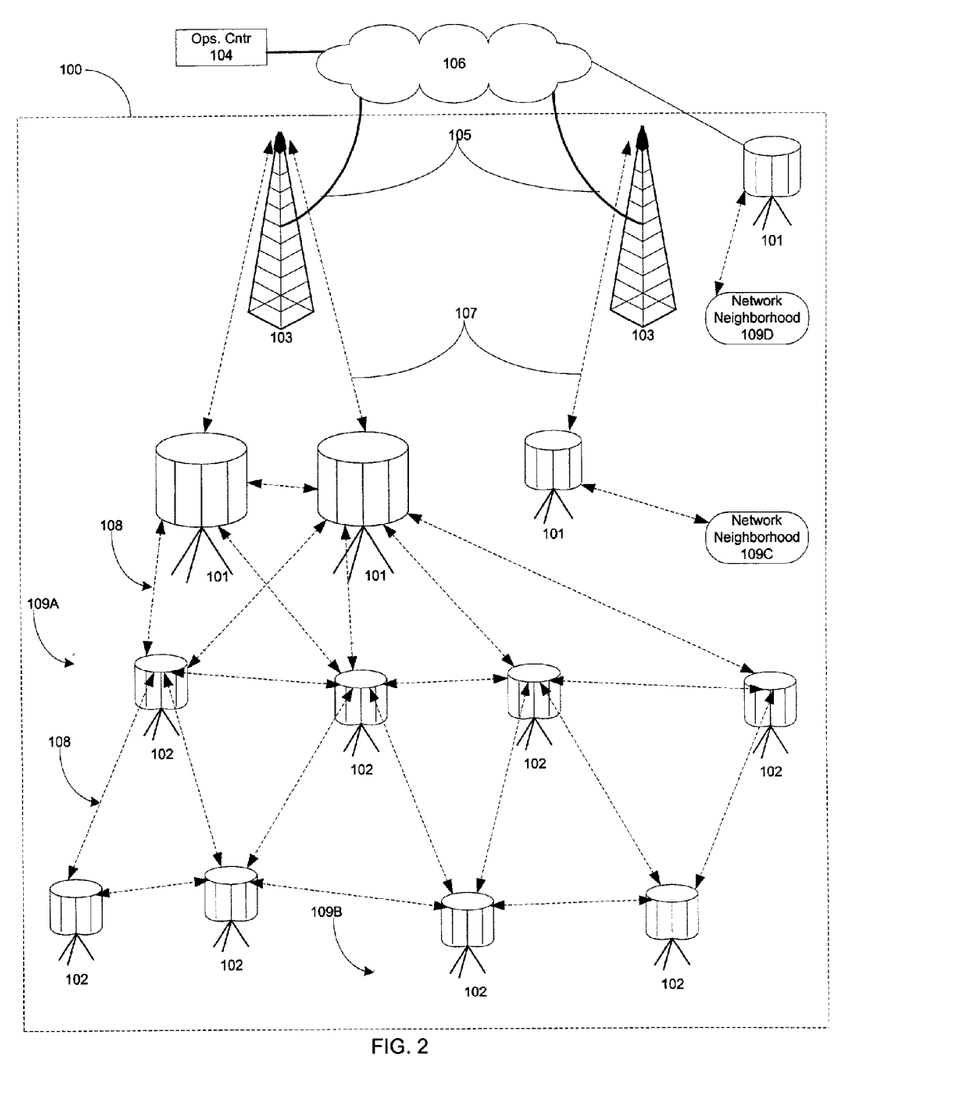
FIG. 2 is a network diagram depicting an exemplary portion of an embodiment a network, such as a portion of a MAN of FIG. 1, in accordance with an aspect of the present invention.

FIG. 2 is a network diagram depicting an exemplary portion of an embodiment of a network 100 in accordance with an aspect of the present invention. Network 100 comprises network access concentrators (SNAPs) or MAPs 103, network access points or neighborhood access points (NAPs) 101 and network access nodes 102. Network 100 traffic may be routed from a network access node 102 to a neighboring network access node 102. Such a neighboring network access node 102 may route such traffic to one of its neighboring network access nodes 102 and so on until a NAP 101 or a final destination network access node 102 is reached. Notably, nodes 102 may be in communication with one another but not with any node 101 to form a private wireless network. Nodes 101 may be in communication with one another. Nodes 101, 102 may be located on roof-tops, for example as on a building 200 illustratively shown in FIG. 7, in windows, in attics, on a pole, on a telephone pole, and the like. More particularly, in a dense mesh, namely, a mesh with a sufficient number of nodes, a node 102 may be located within a building, for example on a desk.

MAPs 103 may be coupled to various backhauls 105, which backhauls 105 may be coupled to network 106, for example backhauls 105 may be coupled to PoPs 110 (shown in FIG. 1). Network 106 may be coupled to an operations center (OC) 104. Backhauls 105 may form a part of network 106. Network 106 may comprise a portion of the Internet, a private network, or the like. By private network, it is meant a network not connected to the Internet.

NAPs 101 may be in communication with MAPs 103 or network 106 via backhaul communication links 107. It should be understood that backhauls may be wired or wireless. In particular, backhauls coupled to NAPs 101 may be wireless backhauls. In an embodiment, point-to-point communication is used as between a MAP 103 and a NAP 101 in the Unlicensed National Information Infrastructure (UNII) band. Though, at locations where wired connectivity is available, wired connectivity may be used for a backhaul directly to network 106.

Network access nodes 102 are in wireless communication with at least one NAP 101 or node 102. It should be understood that nodes 102 or NAPs 101 may be configured for any of or some combination of broadcasting, point-to-point communication and multicasting. By broadcasting, it is meant transmitting without singling out any particular target recipient among a potential audience of one or more recipients. By point-to-point communicating, it is meant transmitting with singling out a particular target recipient among a potential audience of one or more recipients. By multicasting, it is meant transmitting with singling out a plurality of particular target recipients among a potential audience of recipients. For purposes of clarity, communication between nodes 102, between NAPs 101, or between a NAP 101 and a node 102, is described in terms of point-to-point communication though other types of communication as described above may be used.

In one embodiment, communication is done using radio waves in the UNII band. However, other known bands may be used. Nodes 102 form, at least in part, a Wide Area Network (WAN) using in part wireless interlinks 108. More particularly, IEEE 802.11a physical and link layer standards may be employed for communication in a range of 9 to 54 megabits per second (Mbits/s). Thus, nodes 102 may be used to form neighborhoods of nodes, such as network neighborhoods 109A through 109D. Each such neighborhood 109 may be in communication with one or more NAPs 101 for accessing network 106.

Communication slots as described herein are time slots with associated frequencies. However, one of ordinary skill in the art will understand that other types of communication spaces may be used, including without limitation codes, channels, and the like. Referring to FIG. 1, NAPs 101 and nodes 102 communicate with one another and with each other by sending and receiving information during short time slots referenced to the beginning of a frame. Each frame is approximately a same length of time. By way of example and not limitation, each frame may be approximately one second long, approximately beginning and ending on each second. Notably, one or more time slots may exist within a frame. By way of example and not limitation, if a time slot has a length of approximately one millisecond, then approximately 1000 time slots may be available within a frame. Moreover, a frame may be divided into subframes, as is known. For example, a 1 second frame may be divided into five 200 ms subframes, each of which contains 200 1ms slots. Though fixed slot lengths are described for purposes of example, it should be understood that variable slot lengths may be used, and such variable slot lengths may vary within a frame.

Each node 102 and NAP 101 operates to a same time reference as each other node and NAP in network 100, whether such time reference is a true time or an arbitrary synch time. A reference time may be obtained by satellite using GPS, as described below. Alternatively, a frame reference signal may be transmitted between nodes at the beginning of a frame using a special purpose time slot. By way of example and not limitation, such a special purpose time slot may be approximately 200 microseconds in duration for transmission of approximately a onemicrosecond pulse or such a special purpose time slot may comprise a coded waveform.

Figure 3:
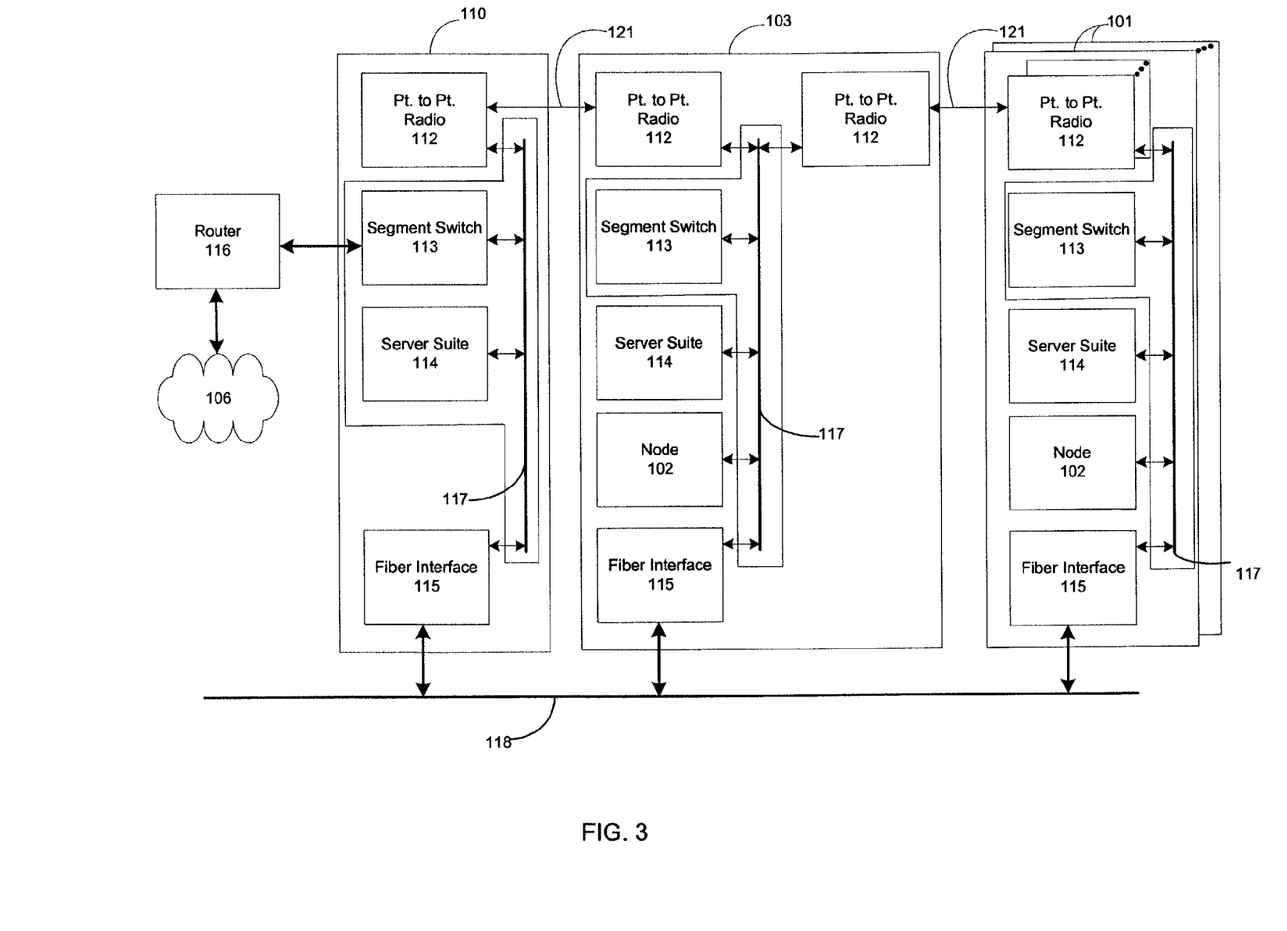
FIG. 3 is a block diagram depicting an exemplary portion of an embodiment of network infrastructure in accordance with an aspect of the present invention.

FIG. 3 is a block diagram of an exemplary portion of an embodiment of network infrastructure in accordance with an aspect of the present invention. With reference to FIGS. 2 and 3, network 106 is coupled to router 116. Router 116 is coupled to PoP 110. PoP 110 is coupled to MAP 103 which is coupled to at least one NAP 101.

PoP Facility and Operations Center Equipment

PoP 110 comprises point-to-point radio or transceiver 112, segment switch 113, server suite 114 and fiber interface 115. Segment switch 113 may comprise a bus 117 for coupling to radio 112, server suite 114 and interface 115, as well as node 102. Fiber interfaces 115 may be used for coupling to optical fiber lines 118 where available, in which embodiment radio 112 may be omitted. However, if one or more fiber connections are not available, a point-to-point radio 112 may be used for wireless connectivity 121. PoP 110 facilities equipment and operations center 104 equipment may be co-located.

Server suites 114 comprise redundant servers including but not limited to one or more DNS, mail, news, web caching, file caching, streaming services including multimedia, provisioning, authentication, peer-to-peer sharing management, among other known server applications. Such server suites 114 provide demarcations for wireless services and operations of network 100 of FIG. 2.

Network 106 is coupled to router 116, which is coupled to segment switch 113. Segment switch 113 of PoP 110 is used to connect network 100 to a carrier provider's aggregation router 116 and to provide Border Gateway Protocol (BGP) services between network 100 and carrier service provider network 75. Segment switch 113 may be configured to implement transport policy for services associated with network 100.

MAP Equipment

MAP 103 may be an aggregation of facilities where traffic to and from PoP 110 is divided into traffic to and from NAPs 101. Each MAP 103 may support more than one NAP 101. MAP 103 comprises point-to-point radios 112, segment switch 113, server suite 114, optionally node 102, and optionally fiber interface 115. Radios 112 provide MAP 103 with connectivity to and from PoP 110 and NAPs 101. Segment switch 113 aggregates NAP traffic to and from PoP 110. If optical fiber 118 connectivity is available, optional fiber interface 115 may be used for connecting to PoP 110 and/or to one or more NAPs 101, which may render one or more radios 112 optional.

Server suite 114 is as described above. Additional MAP equipment may comprise backup power, remote monitoring equipment, and remote control equipment.

Depending on local mesh coverage, a node 102 may be co-located with a MAP 103.

NAP Equipment

NAP 101 comprises point-to-point radio 112, segment switch 113, server suite 114, node 102, and optionally fiber interface 115. Radio 112 provides a communication interfaces to MAP 103. Segment switch 113 aggregates neighborhood node traffic to and from MAP 103. If optical fiber connectivity is available, optional fiber interface 115 may be used for connecting to MAP 103, which may render radio 112 optional.

Server suite 114 is as described above including any and all additional NAP equipment from backup power source, remote monitoring equipment, and remote control equipment.

Notably, in areas where multiple NAPs 101 serve a neighborhood, NAP 101 may be scaled down to a node 102 and a backhaul 107. Backhaul 107 may be provided by a node 102 configured with a high gain antenna for point-tot point communication. Moreover, a NAP 101 may be configured to support multiple radio channels by including multiple radio's 112. More particularly, multiple single sector radios or multiple radios for a multiple sector antenna may be used.

Network Node

Figure 4:
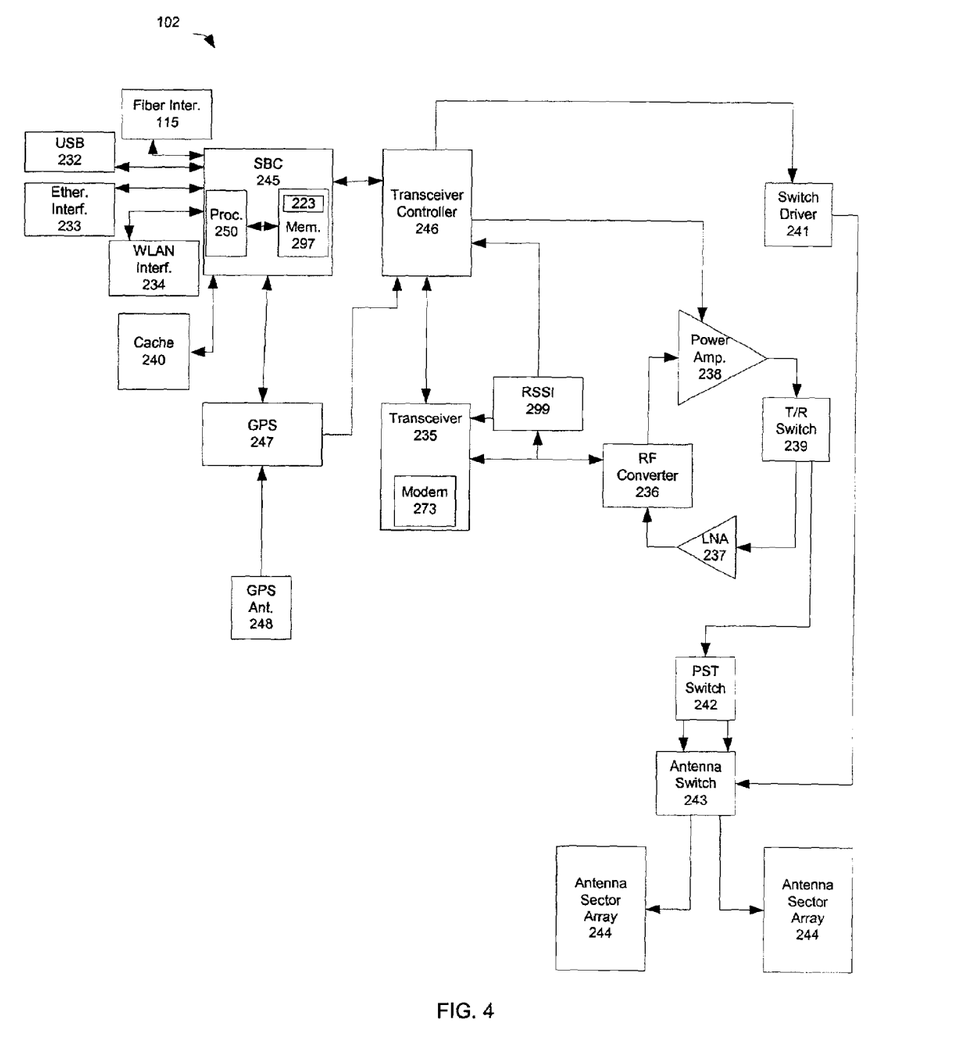
FIG. 4 is a block diagram of an exemplary portion of a network node in accordance with an aspect of the present invention.

Referring to FIG. 4, there is shown a block diagram of an exemplary portion of a node 102 in accordance with an aspect of the present invention. Antenna sector arrays 244 are coupled to antenna switch 243. Antenna sector arrays 244 may comprise for example sectors each of an eight sector antenna.

Figure 4A:
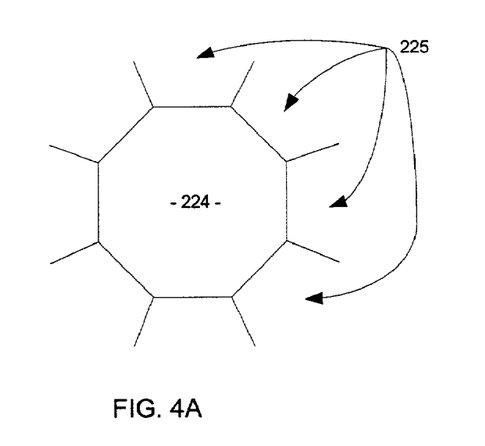
FIGS. 4A, 4B and 4C are cross-sectional views depicting exemplary portions of embodiments of antennas in accordance with aspects of the present invention.
Figure 4B:
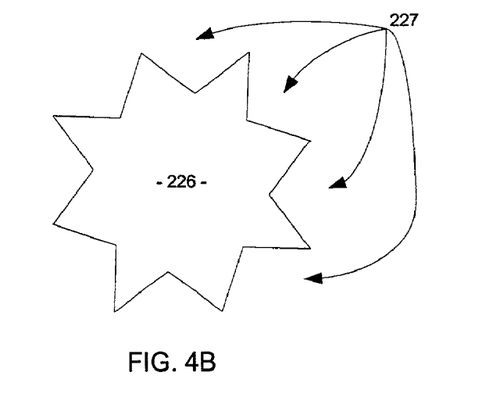
Figure 4C:
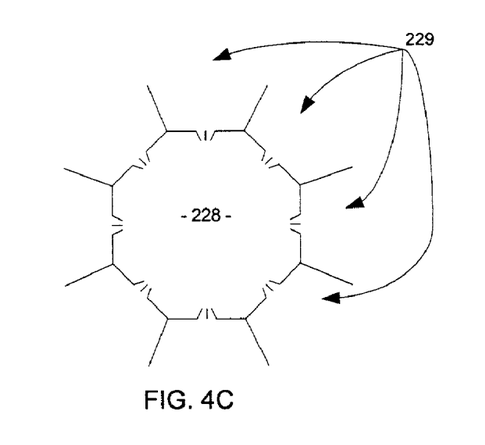

Referring to FIGS. 4A, 4B and 4C, there are shown cross-sectional views of exemplary portions of embodiments of antennas 224, 226 and 228, respectively, in accordance with aspects of the present invention. Antenna 224 comprises eight trough reflector sectors 225. Antenna 226 comprises eight corner reflector sectors 227. Antenna 228 comprises eight modified trough reflector sectors having feed boards 229A. An exemplary embodiment of antenna 228 may have approximately a ten degree vertical beamwidth and a horizontal beam width of approximately 360 degrees divided by 8 sectors. Though an eight-sectored antenna is illustratively described herein, such an antenna may comprise fewer or more sectors than eight, namely, 1 to q sectors for q an integer. Though a sectored antenna is described, other antenna configurations may be used, including but not limited to an omni-directional antenna, a collection of individually pointed directional antennas, a combination of a sectored antenna and an omni-directional antenna, a beamforming antenna or smart antenna, and the like. Moreover, though an approximately ten degree vertical beamwidth is used other beamwidths may be used.

Referring again to FIG. 4, antenna switch 243, which may be a multi-position switch, is used to select a sector in one of two banks of antenna arrays 244. For example, each bank may comprise four sectors. Switch 242 coupled to switch 243 is used to select one of the two banks of antenna arrays 244. A sector switch control signal is provided from radio controller or transceiver controller 246 to switch driver 241, and in response switch driver 241 provides a drive signal to switch 243 for switching to a selected sector of an array 244.

Transmit/receive (T/R) switch 239 is set depending on whether information is being transmitted from or received to node 102. T/R switch 239 is set in response to a control signal from controller 246. A control signal is supplied from controller 246 to power amplifier 238 for activation and deactivation of amplifier 238. If power amplifier 238 is on, then T/R switch 239 is set to transmit, and if power amplifier 238 is off, then T/R switch 239 is set to receive.

A received signal is provided from switch 239 to linear low noise amplifier (LNA) 237, which amplifies the incoming signal. The amplified signal is provide from amplifier 237 to radio frequency (RF) converter 236.

When transmitting data, an input to RF converter 236 is up converted from an intermediate frequency (IF) to a transmission frequency to provide an output to amplifier 238, which amplifier 238 amplifies signal strength to provide additional power for transmission. When receiving data, RF converter 236 down converts an incoming signal to an IF. When receiving data, an IF output of RF converter 236 is provided to transceiver 235.

RSSI 299 samples a received signal from an output of RF converter 236, and provides an indication of signal strength of such a received signal to transceiver controller 246 and to modem 273 of transceiver 235.

Transceiver 235 receives data to and from modem 273, which receives data to and from transceiver controller 246 and to and from RF converter 236. Transceiver controller 246 provides control and configuration signals to transceiver 235 and to modem 273, as explained in more detail below. Modem 273 may be an IEEE 802.11a compliant device.

Accordingly, for data transmission, radio 235 obtains data to be transmitted from transceiver controller 246 and converts it from a digital form to an analog form using modem 273. Transceiver 235 modulates such data and converts such modulated data to an IF, for example in a range of approximately 100 MHz to 400 MHz. RF converter up converts from such an IF to a transmission frequency. In an embodiment, RF converter 236 is implemented using a 5.8 GHz UNII band radio. However, other radios with other frequencies may be used. Examples of transmit frequencies are in a range of 5.235 GHz to 5.835 GHz.

Radio 235 is coupled to radio controller or transceiver controller 246. In an embodiment, radio controller 246 may be implemented using a field programmable gate array (FPGA), described in more detail elsewhere herein. Radio controller 246 is coupled to a single board computer (SBC) 245. SBC 245 comprises memory 297 and processor 250. SBC 245 is configured for routing traffic, and in this context may be considered a router. SBC 245 may optionally be coupled to cache memory 240 for caching a portion of Internet content or other network content. Cache memory may comprise one or more disk drives, or other mass storage devices using magnetic or semiconductor memory technology.

SBC 245 may be coupled to a wireless local area network (WLAN) interface 234, an Ethernet interface 233, a Universal Serial Bus (USB) interface 232, a fiber channel interface 115 or the like. A fiber channel interface 115 may be used for backhaul communication, which may be coupled to SBC 245 via an interface or optionally directly coupled to SBC 245. Backhaul communication devices depend on the type of backhaul used, as mentioned elsewhere herein such a backhaul may be wired or wireless.

Global Positioning System (GPS) 247 antenna 248 is coupled to GPS 247. GPS 247 is coupled to radio controller 246 and SBC 245. GPS antenna 248 receive information on position of node 102, as well as a timing pulse. In an implementation, a one pulse-per-second (1 PPS) signal is received by GPS 247 and provided to radio controller 246.

SBC 245 uses a non-real-time operating system 223, such as Linux, MS Windows, and UNIX, among others, to execute a channel access protocol, an example of the latter of which is described in more detail in the Hammel application. Transceiver controller 246 is a real-time execution unit or a real-time controller which is used to perform timed control of modem 273 and transceiver 235. SBC 245 performs network control functions, such as network discovery, slot assignment, packet caching and bundling, and traffic routing, and slot assignments. Real-time controller 246 executes transmit and receive slots 191, 190 (shown in FIGS. 6B and 6A, respectively), including direct control of transceiver 235 and antennas 244, according to processor 250's schedule.

Figure 5:
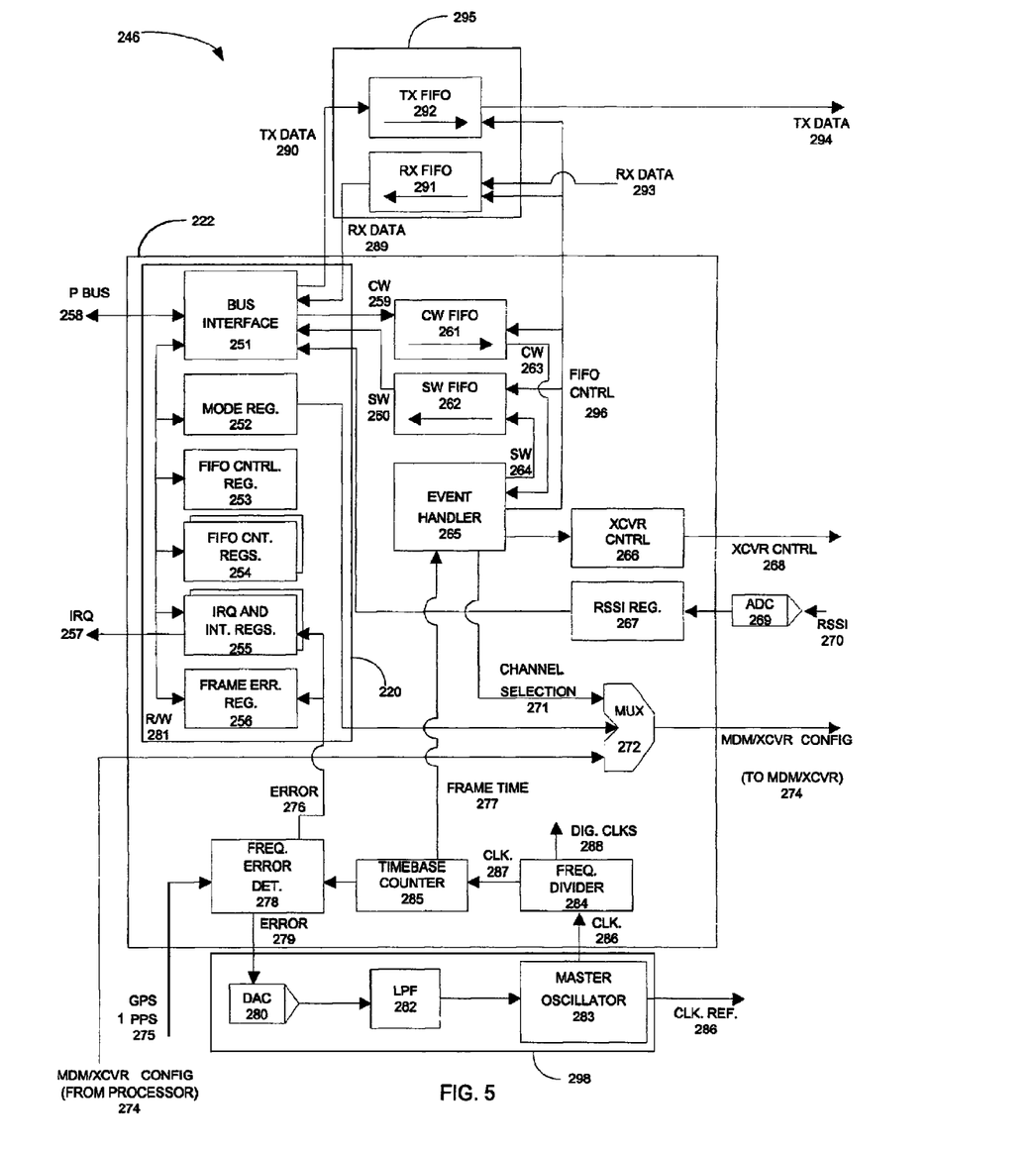
FIG. 5 is a block diagram depicting an exemplary portion of an embodiment of a real-time controller in accordance with an aspect of the present invention.

Referring to FIG. 5, there is shown a block diagram of an exemplary portion of an embodiment of real-time controller 246 in accordance with an aspect of the present invention. With continuing reference to FIG. 5 and renewed reference to FIG. 4, controller 246 may be implemented using a field-programmable gate array (FPGA) 222 and peripheral components, namely, digital-to-analog converter 280, low pass filter 282, oscillator 283 and memory 295. Though an FPGA is described herein, it should be understood that discrete components or an application specific integrated circuit may be used instead of FPGA 222.

Real-time controller 246 in FPGA 222 contains several modules, including: processor module 220 comprising processor bus interface 251 and processor-accessible registers 252 through 256; event handler module 265, which processes and executes control words for defining each slot; transceiver control functions module 266; and timebase module 285.

Processor 250 uses processor bus 258 and bus interface 251 to control and monitor FPGA 222 by writing to and reading from addresses using read/write bus 281.

Bus interface 251 decodes addresses to determine which module processor 250 is attempting to access. Bus interface 251 then passes data from processor 250 to a target module. Conversely, bus interface 251 may decode addresses from a module of controller 246 to pass data to processor 250. In addition to the above-mentioned modules, other addresses corresponding to first-in-first-out queues (FIFOs), namely FIFO buffers ("FIFOs") 261, 262, 291 and 292, and to RSSI register 267 may be written to or read from FPGA 222.

FPGA 222 registers accessible by processor 250 comprise: mode register 252 used to control FPGA 222 mode of operation, FIFO control register 253 used to control FIFO buffers 261, 262, 291 and 292, FIFO count registers 254 used to provide status and a count of the words each FIFO buffer 261, 262, 291 and 292, IRQ and interrupt registers 255 used to clear processor interrupt flags and enable/disable various processor interrupt conditions, frame error register 256 used to provide a value of a timebase error for the current frame, and received signal strength indicator (RSSI) register 267 used to receive RSSI output 270 after conversion by analog-to-digital converter 269 and to provide such a digital RSSI output to bus interface 251 for processor 250.

Real-time controller 246 includes four FIFO buffers: a control word FIFO 261, a status word FIFO 262, and two data FIFOs, namely received data FIFO 291 and transmit data FIFO 292. Data FIFOs may be implemented in memory provided as part of FPGA 222. However, data FIFOs 291 and 292 are shown as implemented in external memory 295 to allow larger FIFO depths than FPGA 222 may have. Memory 295 may be a random access memory (RAM), rewritable read only memory (flash memory, EEPROM and the like) or other suitable memory.

Figure 6A:
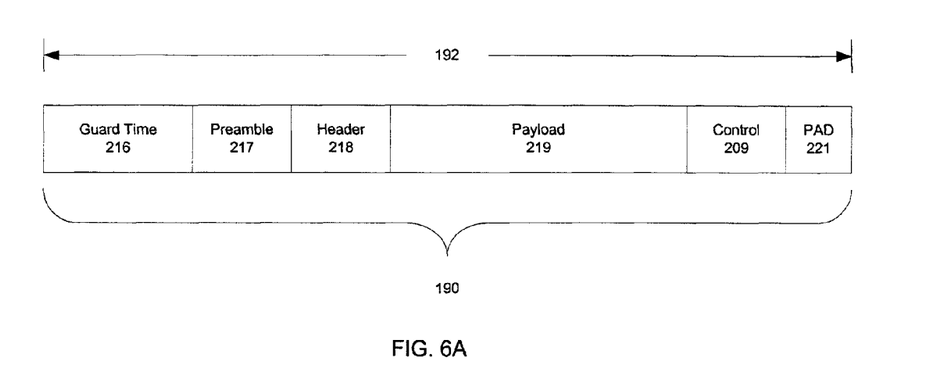
FIGS. 6A and 6B are block diagrams depicting a receive slot and a transmit slot, respectively, in accordance with aspects of the present invention.
Figure 6B:
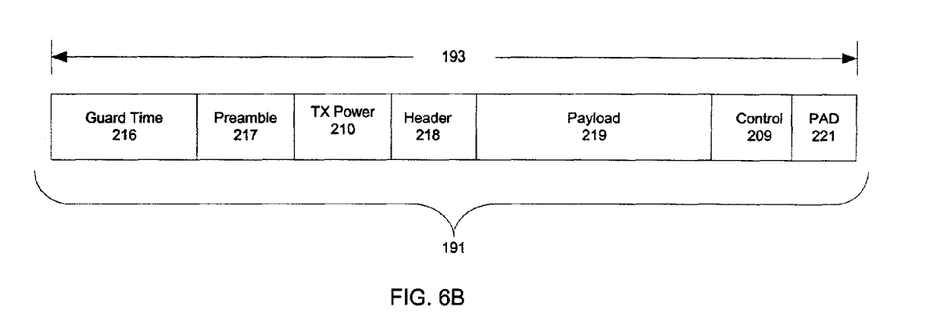

With continuing reference to FIGS. 4 and 5, and additional reference to FIGS. 6A and 6B, where there are shown block diagrams of a receive slot 190 and a transmit slot 191 in accordance with aspects of the present invention, processor 250 writes a set of control words to FPGA 222 to schedule future transmit and receive slots 190, 191.

Control word (CW) FIFO 261 contains control words, from control word signal 259, defining each transmit or receive slot 190, 191. Each control word includes a sequence number for correlation with transmit FIFO 292 and status word FIFO 262, specifies whether a slot is a transmit or receive slot 190, 191, specifies which frequency channel shall be used, specifies which antenna or sector 225, 227, 229 shall be used, specifies start time of a guard time period 216 and of a slot 190, 191 with respect to the start of the current frame, and specifies duration of such guard time period 216 and of such slot 190, 191.

Each slot 190, 191 comprises a guard time period 216, a preamble section 217, a header section 218, a payload section 219, a control section 209 and padding (PAD) section 221. Padding is used to fill out a slot length. TX slot 191 further comprises a transmit power section 210. However, information in TX power section 210 is not transmitted, rather section 210 is stripped-off by modem 273 prior to transmission. SBC 245 is used to generate information for tx power section 210 and header 218, and to include payload for payload section 219. Modem 273 adds preamble 217 to incoming messages. Modem 273 adds any padding to section 221 and control information to section 209. Modem 273 may use convolutional coding of control information for section 209. Moreover, SBC 245 may use error coding for information in payload section 219 and include such error coding information in either of both section 209 and 219. SBC 245 may use an error control code such as a cyclic-redundant code (CRC), Reed Solomon, convolutional code and the like. Guard time period 216 is longer than time used to configure transceiver 235 from control word data.

Real-time controller 246 allows processor 250 to specify guard time period 216 and slot duration 192, 193 for each slot. This facilitates a MAC protocol or a channel access protocol running on processor 250 to vary guard time and slot duration for each slot in response to network conditions.

Real-time controller 246 generates a status word (SW) in status word FIFO 262 in response to each control word so that processor 250 may determine whether node 102 has failed to execute a slot and cause of any such failure. A status word is generated by event handler 265 as status word signal 264 in response to control word signal 263. Status words 264 are buffered in FIFO 262 for providing status words 260 to interface 251 for processor 250. Each status word: contains a sequence number equal to a sequence number in a corresponding control word, indicates whether a slot was a transmit slot 191 or a receive slot 190, indicates channel status at a designated start time of a slot 190 or 191, indicates measured packet detection time for a receive slot 190, indicates status of phase-locked loops (PLLs) of transceiver 235 during a slot 190 or 191, indicates the number of data words received for a receive slot 190, and indicates whether an error condition occurred in which transmit FIFO 292 contained less data than specified by a control word for a transmit slot 191.

A status word describes status of a frequency channel specified for a slot by a control word. Channel status indicates whether a measurement of a received signal strength indicator (RSSI) at the start of such a slot exceeded a "busy channel" threshold and whether node 102 detected a received packet. Accordingly, a packet detection indication applies to receive slots 190 and does not apply to transmit slots 191.

For transmit slots 191, a busy channel at the start of a transmit slot indicates a possible slot failure due to interference. For receive slots 190, a busy channel at the start of the slot is a necessary but not sufficient condition for success, because a channel may be busy with either a desired signal or an interfering signal. A valid packet indication applies to receive slots 190.

A MAC protocol or channel access protocol may combine busy channel and packet detection indications to determine whether interference caused a receive slot failure. Failure of FPGA 222 to receive data or failure of error control code 209 to correct errors within received data facilitates detection of a receive slot 190 failure by a MAC or channel access protocol.

A MAC protocol or channel access protocol may assess synchronization within network 100 and may measure propagation delay between nodes from an observed packet detection time, provided by a status word.

FPGA 222 buffers data flow between a non-real-time MAC or channel access protocol and modem 273 with two data FIFO buffers 291 and 292. Transmit FIFO 292 accepts bundled transmit data, such as superpackets, from processor 250. A superpacket is a bundle of packets destined for a same destination node. One superpacket corresponds to each control word in control word FIFO 261 that specifies a transmit slot 191. Each transmit superpacket includes a sequence number equal to a sequence number in a corresponding control word. FPGA 222 compares sequence number values at a designated transmit time and provides signals for transmitting in the event of a match. FPGA 222 triggers a processor interrupt, as indicted by IRQ signal 257, in the event of a mismatch of such sequence number values. FPGA 222 passes a transmit superpacket to transceiver 235 at a time specified in a control word.

Receive FIFO 291 accepts a received superpacket from transceiver 235 at time specified in a control word. FPGA 222 adds a sequence number equal to that in a corresponding control word to each received superpacket. Processor 250 may verify a sequence number match between each received superpacket and status word to verify that no data has been lost.

Real-time controller 246 maintains a precise frequency reference by comparing the number of oscillations of master oscillator 283 in a one-second period as measured by GPS 247 to an expected value for a correct oscillator frequency. Frequency error detector 278 receives a 1 PPS signal 275 from GPS 247 and checks for error as mentioned. Detector 278 generates an error signal 279 proportional to error measured for each second, and an error flag signal 276 for register 255 and 256. A digital-to-analog converter (DAC) 280 converts error indicated by error signal 279 to an analog format. Such an analog error signal is filtered by a low pass filter (LPF) or integrator 282, and such a filtered signal is used to tune frequency of a voltage controlled frequency oscillator (VCXO) 283. An implementation of VCXO 283 uses an 80 MHz VCXO because this is a frequency suitable for FPGA clocking and because it is an exact integer multiple of the sampling clock needed by an 802.11a modem. A precision 80 MHz reference may be used to generate radio frequency (RF) local oscillators (LO). Accordingly, a frequency divider 284 may be used to receive a reference clock signal 286 to divide it by several integer values to generate digital clocks 288 for internal controller logic and controller clock signal 287, each of which may be related to clocks used by an 802.11a modem.

A frame, which may be set to be one second long, is set to start at a GPS 1 PPS signal. Thus, nodes 101 and 102 may obtain frame synchronization without intercommunication. Real-time controller 246 maintains a timebase counter 285 to track a current frame time 277. Timebase counter 285 counts clock pulses from clock signal 287, for example 10 MHz clock cycles from an 80 MHz reference divided by eight, so timebase value counts from zero at the start of a frame to an expected value, for example of $10^7-1$, at the end of such a frame.

Real-time controller 246 comprises event handler module 265 to monitor timebase and execute all slots at their designated times. Event handler module 265 is configured to continually compare the start time of a next active control word (if any) to a timebase value using frame time 277, and in response, executes a slot when these values are equal. Event handler 265 signals transceiver control module (XCVR CNTRL) 266 to set switches to turn on a selected antenna, to test a selected antenna switch to verify correct operation, and to signal modem 273 to start either a transmit or a receive process. Modem 273 controls timing of data transfers between modem 273 and controller 246.

Processor 250 performs initial modem 273 and transceiver 235 configuration at node 102 start-up over modem/transceiver configuration bus 274. Event handler module 265 configures transceiver 235 PLLs for each designated frequency on a slot-by-slot basis and provides a signal to transceiver controller 266 for controlling transceiver 235 via transceiver control signal 268. FPGA 222 multiplexes bus 274 using mux 272 in response to mode register 252. At start-up, processor 250 writes to mode register 252 using read/write bus 281 to take control of configuration bus 274, to perform configuration of transceiver 235 and modem 273, and to return control of bus 274 to FPGA 222 with another mode register 252 write.

Event handler 265 generates FIFO control signals on FIFO control bus 296 in response to one or more control word signals 263 and timed with frame time 277. Event handler 265 provides a channel selection signal 271 to mux 272 for transceiver 235.

Controller mode register 252 allows processor 250 to specify operating condition of controller 246, including: normal operation; transmit-inhibited mode, namely, normal operation except that power amplifier 238 is disabled to prevent actual transmission, such as a during test or in response to a detected antenna switch failure; processor write-through mode as described above with respect to multiplexer 272 set to grant bus 274 access to processor 250; and control word holdoff mode, in which event handler module 265 is temporarily suspended during one or more tests.

Controller 246 comprises FIFO control register 253, which allows processor 250 to unload contents of any or all of FIFOs 261, 262, 291 or 292 in response to an error condition signified by a processor interrupt signal 257.

Controller 246 comprises FIFO count registers 254 for each FIFO 261, 262, 291 and 292. A count value corresponds to the number of words currently contained in a FIFO 261, 262, 291 or 292.

Controller 246 comprises interrupt flag and an interrupt mask registers 255. Interrupt flag register 255 indicates several conditions, including: timebase counter overflow, for example due to absence of a GPS 1 PPS signal; sequence number mismatch between transmit FIFO 292 and control word FIFO 261; almost full and overflow flags for each of FIFO buffers 261, 262, 291 and 292; frame error, for example a GPS 1 PPS arrived during a slot as defined by a control word—indicates an error in such a control word created by processor 250; GPS 1 PPS signaling start of a frame to processor 250; antenna switch failures, for example one or more antennas cannot be turned off due to a hardware failure; and timebase error overflow, for example timebase error has exceeded its defined range—indicates a possible hardware failure in oscillator circuit 283.

Interrupt mask register 255 facilitates processor 250 to independently enable or disable interrupts in response to any of the interrupt flag register 255 conditions listed above. Bits in interrupt flag register 255 are set in response to one or more of such conditions. Processor 250 responds to an controller 246 interrupt request by reading interrupt flag register 255 and handling conditions represented by each bit set. Thus, processor 250 can clear one or more bits corresponding to one or more conditions as each is handled. Conditions occurring while processor 250 is responding to an interrupt request will not be cleared until processor 250 handles those conditions on a successive interrupt register read. Clearing some interrupt register bits but not others triggers another interrupt request provided those conditions are not masked in interrupt mask register 255.

Controller 246 includes a received signal strength indicator (RSSI) register 267, allowing processor 250 to assess energy in a current channel at any time. An analog-to-digital converter (ADC) 269 converts or maps an analog RSSI value 270 to a digital value for RSSI register 267.

Figure 7:
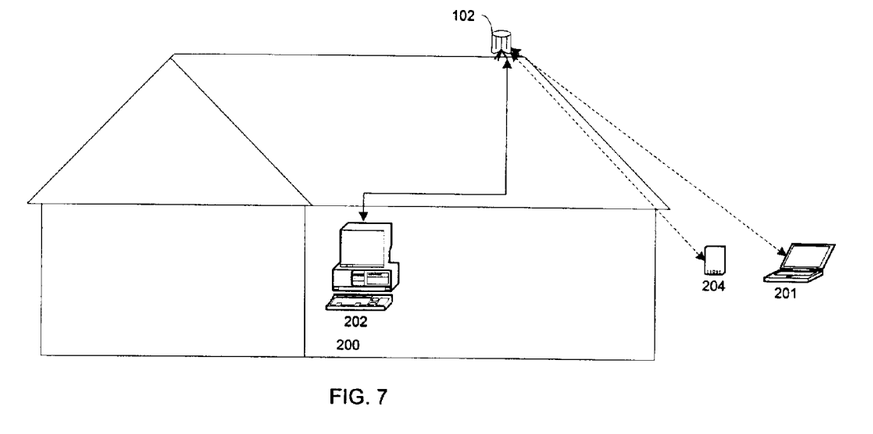
FIG. 7 is a diagram of a building having consumer premises equipment (CPE) including computers and a node in accordance with an aspect of the present invention.

In FIG. 7, there is shown a building 200 having a node 102 in accordance with an aspect of the present invention. Building 200 may house any of a variety of devices such as computers, printers, set-top boxes, PDAs, and like devices, namely Customer Premises Equipment (CPE), having network connectivity capability, including without limitation connectivity to the Internet. For purposes of illustration, computer 202 is shown wired to node 102, and notebook computer 201 and PDA 204 are shown using wireless connectivity such as a wireless local area network (WLAN). By way of example, node 102 may comprise a 2.4 GHz PCMCIA LAN "card" for the WLAN portion and a 10baseT or 10baseT Ethernet "card" for the wired connectivity portion. By "card," it is meant to include integrated circuit chip or a printed circuit board comprising one or more integrated circuit chips. Notably, building 200 may be an office building or an apartment building, where a LAN or WLAN is used for sharing connectivity through node 102.

Installation of node 102 does not require antenna pointing by an installer, and more particularly does not require antenna pointing to a base station. Rather, a multi-sectored antenna is used in combination with node configuration programming to join a mesh network of nodes 102. Moreover, no pre-coordinated effort for joining a such a mesh network is needed owing to sharing of a database. Joining a network is described in more detail in the Hammel application.

Figure 8A:
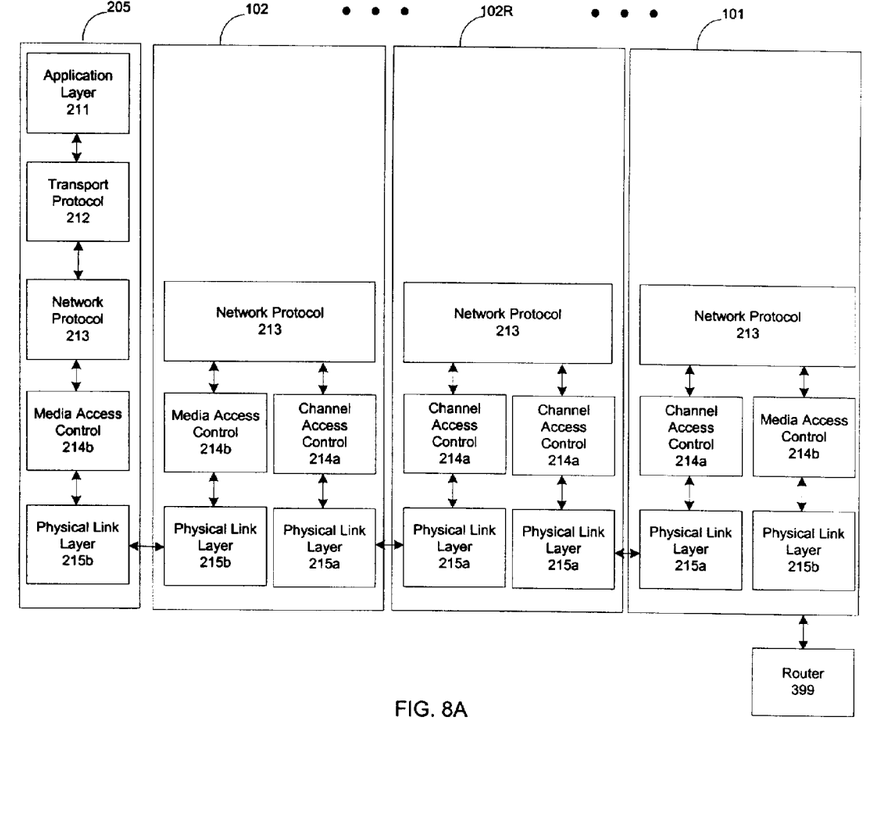
FIGS. 8A and 8B are block diagrams of exemplary embodiments of communications architectures in accordance with one or more aspects of the present invention.

Referring to FIG. 8A, there is shown a block diagram of an exemplary portion of an embodiment of a communications architecture in accordance with an aspect of the present invention. In this architecture, a customer central processing unit or computer 205 comprises an application layer 211, a transport layer 212, a network protocol layer 213, a media access control protocol layer 214b, and a physical link layer 215b. Computer 205 may be a personal computer programmed with an operating system such as Microsoft's Windows or Apple's Macintosh with a web browser enabled software such as Netscape's Navigator or Microsoft's Internet Explorer for application layer 211. Transport protocol layer 212 may comprise UDP, Transport Control Protocol (TCP) or RTP "datagram" services. Network protocol layer 213 may comprise an Internet Protocol (IP) layer.

Media access control protocol layer 214b may be for a wired or wireless LAN. For example, media access control layer 214b may be a WLAN compliant with an IEEE 802.11b standard for media transport or Ethernet LAN connectivity. Physical link layer 215b may be compliant with an IEEE 802.11b standard for physical connectivity.

Node 102 CPE comprises network protocol layer 213, media access control layer 214b, physical link layer 215b, channel access control protocol layer 214a, and physical link layer 215a. Channel access control layer 214a is described in more detail in the Hammel application and is used to provide access to communication channels. Physical link layer 215a may be compliant with an IEEE 802.11a standard for physical connectivity.

If a node 102 is used to relay information for a session, then a relay node 102R may comprise network protocol 213, channel access control protocols 214a and physical link layers 215a. Notably, there may be on or more relay nodes 102R for communication from CPE 102 to NAP 101.

Node 208 is a NAP 101 or a destination node 102 comprising network protocol layer 213, media access control layer 214b, physical link layer 215b, channel access control protocol 214a, and physical link layer 215a. A router 399 is coupled to physical link layer 215b for routing.

Figure 8B:
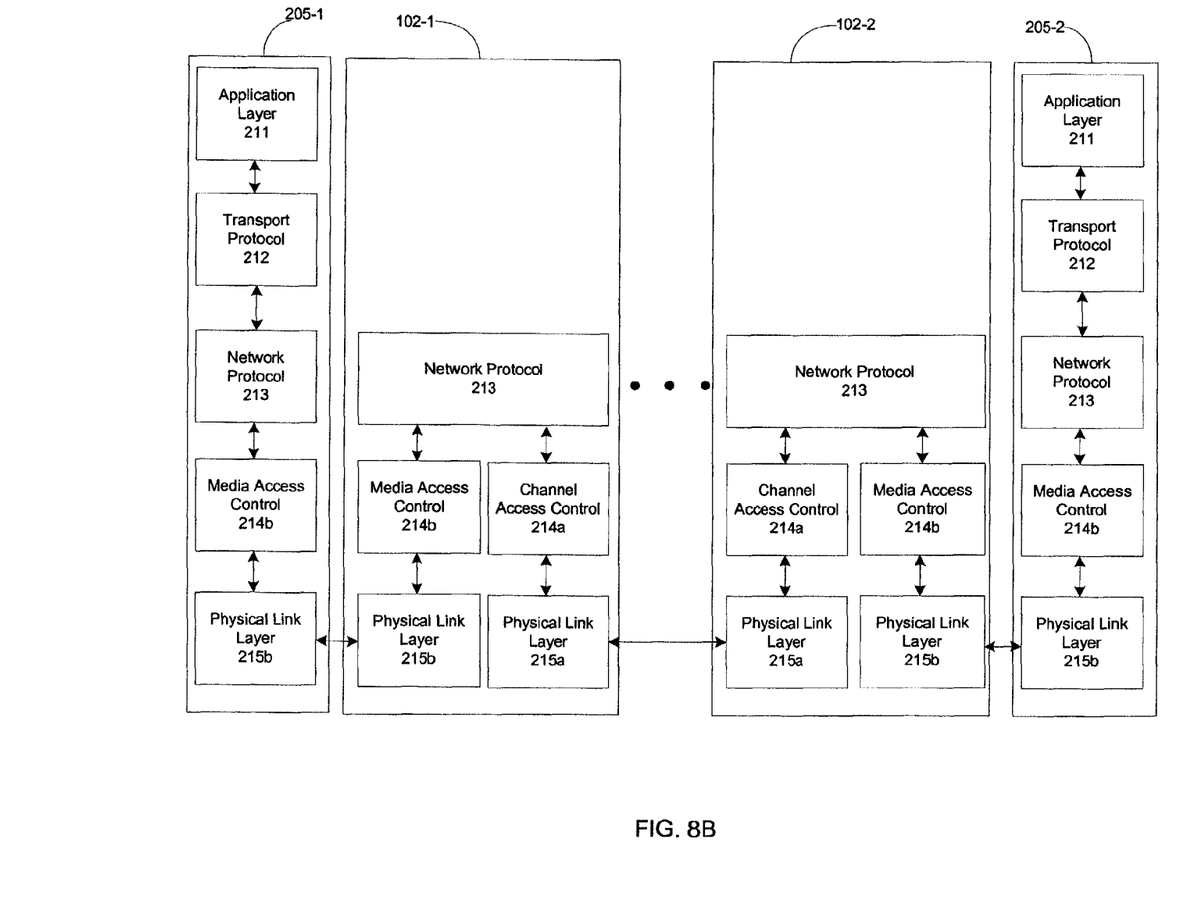

Referring to FIG. 8B, there is shown a block diagram of an exemplary portion of an embodiment of a communications architecture in accordance with an aspect of the present invention. Notably, communication begins with sending computer 205-1 and ends with receiving computer 205-2 via sending and receiving CPE 102-1 and 102-2, respectively, without having coupling to a NAP 101, and thus a private network is facilitated. One or more relay nodes 102R may be between CPE 102-1 and CPE 102-2 for such communication.

Figure 9:
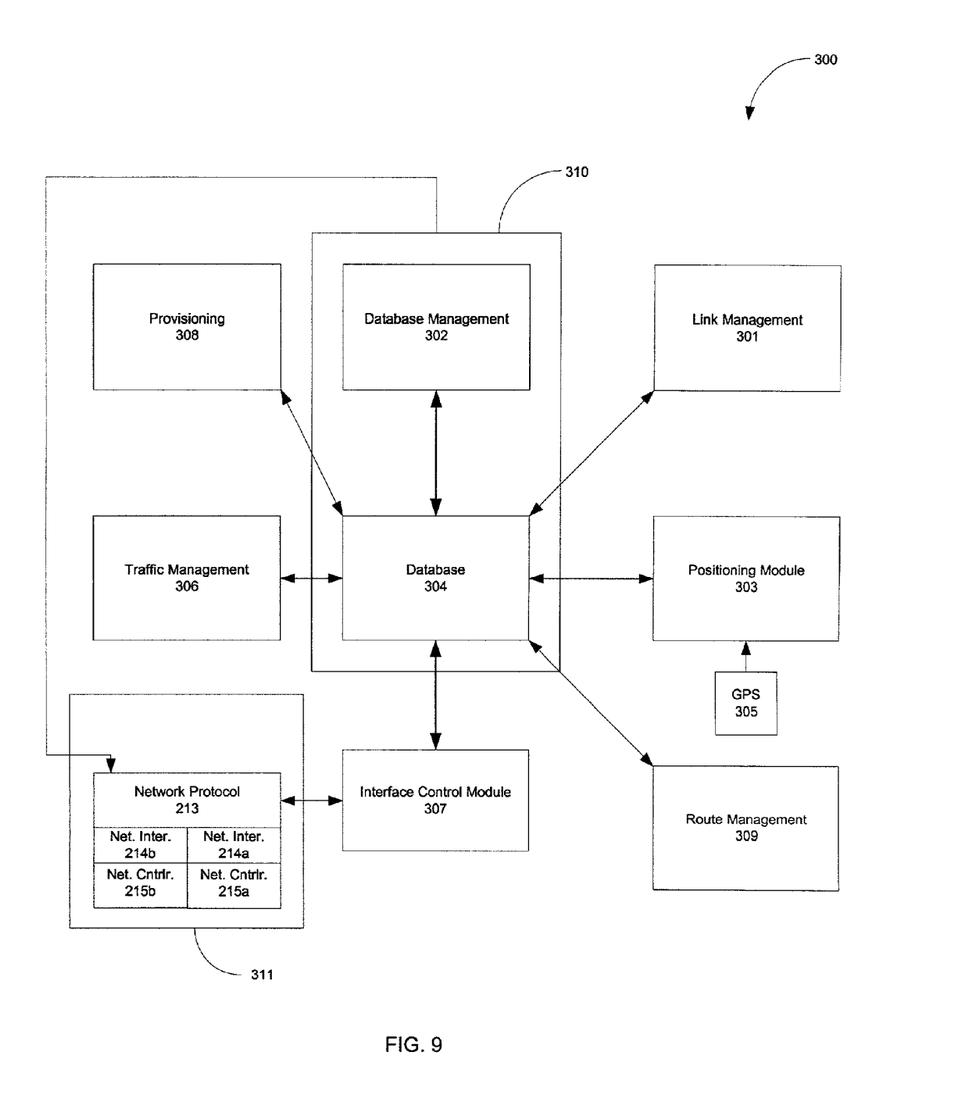
FIG. 9 is a block diagram of a exemplary portion of an embodiment of a software architecture in accordance with an aspect of the present invention.

Referring to FIG. 9, there is shown a block diagram of a exemplary portion of an embodiment of software architecture 300 in accordance with an aspect of the present invention. Software architecture 300 comprises protocol stack module 311, which comprises network protocol layer 213, network interfaces 214a and 214b, and network controllers 215a and 215b.

Software architecture 300 comprises database portion 310. Database portion 310 comprises a shared database 304 and database management 302, both of which are described in more detail in the above-identified co-pending patent application. Database 304 is in communication with link management module 301, positioning module 303, provisioning module 308, traffic management module 306, route management module 309 and interface control module 307.

Positioning module 303 is in communication with GPS 305. Positioning module 303 receive geographic location information from GPS 305 to determine location of a node 102 (shown in FIG. 2). Data fields, described in the Hammel application, for position module 303 are located in database 304. Accordingly, geographic location information is passed from GPS 305 to positioning module 303 for processing, and that processed geographic location information is then stored in database 304. More particularly, positioning module 303 configures GPS receiver 305, including selecting a receiver protocol, changing interface settings (for example, baud rate or parity), setting elevation mask, selecting position and velocity filters, among other configuration settings.

Positioning module 303 accepts location, time and status data, including selective availability status, GPS satellite health, dilution of precision and signal to noise ratio, from GPS receiver 305. Positioning module 303 communicates with GPS receiver 305 using a protocol supported by GPS receiver 305, such protocols include for example Trimble Standard Interface Protocol, Trimble ASCII Interface Protocol and National Marine Electronics Association protocol, among others. Positioning module 303 places node 102 (shown in FIG. 2) location in a record describing such a node 102 (shown in FIG. 2) in shared database 304 for distribution to other nodes 102 (shown in FIG. 2) by database management 302. Database 304 may be used to monitor node 102 (shown in FIG. 2) location for security purposes, for example, to prevent use of a stolen or modified node 102 (shown in FIG. 2) to attack network 100 (shown in FIG. 2). For example, such security may include verifying identity codes from a node 102 (shown in FIG. 2) to determine if such identity codes match a current assigned location for such a node 102 (shown in FIG. 2).

Positioning module 303 uses GPS time to maintain the accuracy of a processor 250 clock and may also use GPS time for security purposes, for example, by verifying that service-related transactions such as content delivery or node 102 (shown in FIG. 2) maintenance occur only at predetermined times. Positioning module 303 may use GPS location and GPS time in generation of encryption keys without intercommunication between nodes.

Database management 302 is used to provide information to other databases on network 100 for forming a shared database. This involves sharing slot allocation information in database 304 with other nodes 102 (shown in FIG. 2) and is described in more detail in the Hammel application. Database management 302 is in communication with WAN interface 214a through network protocol 213 for sharing information with other nodes 102 (shown in FIG. 2).

Slot allocation information may be generated in an adaptive manner for purposes of traffic management 306. Traffic management is described in more detail in the Hammel application. Accordingly, link management module 301, described in more detail in the Hammel application, is in communication with database 304 for obtaining information regarding managing links to other nodes 102 (shown in FIG. 2).

Provisioning module 308 comprises utilities and interfaces used to perform configuration maintenance and monitoring function.

Route management 309 may comprise any of variety of well-known routing algorithms, including but not limited to a link state algorithm, a distance vector algorithm or a combination thereof, and is in communication with database 304.

Database portion 310 is in communication with network layer 213.

Furthermore, a network in accordance with an aspect of the present invention provides users significant bandwidth. By way of example, if each node is capable of communicating at approximately 36 megabits per second (Mbps) and for, every 100 nodes in a mesh, each time slot can be reused by eight transmitter/receiver pairs, then such a network is capable of transporting 288 (36 Mbps*8) Mbps. Thus, for example, if each packet is forwarded through two intermediate nodes in such a network, each packet is transported three times, namely, three hops, so that 96 Mbps of non-duplicated information may be transported at any instant in time in such a mesh. If one-half of such nodes are being used by customers and are actively transmitting or receiving customer traffic, not intermediated nodes, each customer is capable of achieving an average of 1.92 (96 Mbps/50) Mbps of bandwidth using a single frequency channel. Notably, this may be asymmetric or symmetric communication.

Moreover, an aspect of the present invention is a mesh architecture that may comprise only point-to-point links. For point-to-point over-the-air communication, power used for such communication may exceed a United States of America, Federal Communications Commission (FCC) broadcast limit, presently four watts (4 W) Effective Isotropic Radiated Power (EIRP) for the UNII band, up to a point-to-point communication limit, presently two hundred watts (200W) EIRP for the UNII band.

Although various embodiments which incorporate the teachings of the present invention have been shown and described in detail herein, those skilled in the art can readily devise many other varied embodiments that still incorporate these teachings.

All trademarks are the property of their respective owners.

What is claimed is:

1. A network, comprising:
  network nodes, the network nodes arranged in network neighborhoods, the network nodes in the network neighborhoods configured for over-the-air communication with one another, and;
  neighborhood access points configured for over-the-air communication with the network nodes in the network neighborhoods, the neighborhood access points coupled to a backhaul, a subset of the network nodes configured to not be in communication with the neighborhood access points to provide a private network.

2. The network of claim 1 wherein at least one of the network nodes is configured for at least one of point-to-point communication, point-to-multipoint communication and broadcast communication with at least one other of the network nodes.

3. The network of claim 1 wherein at least one of the network nodes is configured only for point-to-multipoint communication with at least one other of the network nodes.

4. The network of claim 1 wherein at least one of the network nodes is configured only for broadcast communication with at least one other of the network nodes.

5. The network of claim 1 wherein at least one of the network nodes is configured only for point-to-point communication with at least one other of the network nodes.

\* \* \* \* \*